United States Patent [19]

Fischer et al.

[11] 3,871,864

[45] Mar. 18, 1975

[54] HERBICIDE

[75] Inventors: Adolf Fischer, Mutterstadt; Siegfried Behrendt, Wachenheim; Bernd-Heinrich Menck, Schilfferstadt, all of Germany

[73] Assignee: Badische Anilin & Soda-Fabrik Aktiengesellschaft, Ludwigshafen/Rhine, Germany

[22] Filed: Jan. 31, 1973

[21] Appl. No.: 328,470

[30] Foreign Application Priority Data

Feb. 14, 1972 Germany............................ 2206861

[52] U.S. Cl..................................... 71/91, 71/122
[51] Int. Cl............................................... A01n 9/14

[58] Field of Search.................................. 71/91, 122

[56] References Cited

UNITED STATES PATENTS

| 2,841,483 | 7/1958 | Swezey et al. | 71/122 |
| 3,130,037 | 4/1964 | Scherer et al. | 71/122 |
| 3,708,277 | 1/1973 | Zeidler et al. | 71/91 |

Primary Examiner—Lewis Gotts
Assistant Examiner—Catherine L. Mills
Attorney, Agent, or Firm—Johnston, Keil, Thompson & Shurtleff

[57] ABSTRACT

Herbicide comprising a mixture of a nitrophenol derivative and a benzothiadiazinone dioxide derivative.

2 Claims, No Drawings

HERBICIDE

The present invention relates to a herbicide comprising a mixture of a nitrophenol derivative and a benzothiadiazinone dioxide derivative.

It is known to use substituted nitrophenols and benzothiadiazine diones as herbicides. However, their herbicidal action is poor.

We have now found that a mixture of a compound of the formula a) 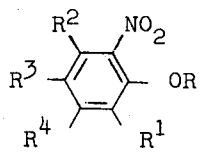

where R denotes hydrogen, acetyl, or chloroacetyl, $R^1$ denotes lower alkyl of a maximum of 6 carbon atoms, alkoxyalkyl or chlorine, $R^2$ denotes hydrogen or lower alkyl of a maximum of 4 carbon atoms, $R^3$ denotes nitro or chlorine, and $R^4$ denotes hydrogen, chlorine or methyl, and a compound of the formula b) 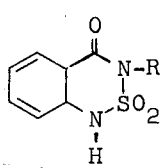

where R denotes lower alkyl of a maximum of 4 carbon atoms, or its salts, has a better herbicidal action than its individual components.

Suitable salts are the alkali metal, alkaline earth metal, ammonium, hydroxyalkylammonium, alkylammonium, hydrazine, fatty alkylammonium, pyridine and aniline salts, and cycloalkylamine salts such as salts of sodium, lithium, potassium, calcium, iron, methylamine, trimethylamine, ethylamine, diethanolamine, ethanolamine, dimethylamine, dimethylethanolamine, hydrazine, phenylhydrazine, pyridine, ethanolamine and cyclohexylamine.

Mixtures in which the weight ratio of a : b is from 1:10 to 5:1 are preferred. The rate of application is from 0.1 to 3 kg per hectare for active ingredient (a), and from 0.5 to 10 kg per hectare for active ingredient (b). The mixtures are applied after the plants have developed leaves.

The herbicides may be used as solutions, emulsions, suspensions or dusts, or in the form of granules. The form of application depends entirely on the purpose for which the agents are being used; in any case it should ensure a fine distribution of the active ingredient.

For the preparation of solutions to be sprayed direct, mineral oil fractions of medium to high boiling point, such as kerosene and disel oil, further coal tar oils and oils of vegetable or animal origin, and cyclic hydrocarbons, e.g., tetrahydronaphthalene or alkylated naphthalenes are suitable.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents. Concentrates which are suitable for dilution with water may be prepared from active ingredient, emulsifying or dispersing agent and possibly solvent. Oils of various types may be added to the spray liquors.

Dusts may be prepared by mixing or grinding the active ingredients with a solid carrier.

Granules may be prepared by applying the active ingredient to a solid carrier (clay, talc, kieselguhr or fertilizer).

Dispersions for spraying direct may be prepared with oils.

The herbicides of the invention are suitable for controlling for instance the following unwanted plants:

| | |
|---|---|
| Alisma plantago-aquatica | waterplantain |
| Anagallis arvensis | scarlet pimpernel |
| Amaranthus retroflexus | redroot pigweed |
| Anthemis spp. | chamomile species |
| Ammania spp. | ammania species |
| Atriplex spp. | saltbush species |
| Butomus umbellatus | swanflower |
| Capsella bursa pastoris | shepherd's purse |
| Centaurea cyanus | cornflower |
| Chenopodium album | common lambsquarters |
| Chrysanthemum segetum | corn marigold |
| Cyperus spp. | flatsedge species |
| Fumaria officinalis | fumitory |
| Galeopsis tetrahit | hempnettle |
| Galium aparine | catchweed bedstraw |
| Papaver rhoeas | corn poppy |
| Polygonum spp. | smartweed species |
| Raphanus raphanistrum | wild radish |
| Ranunculus arvensis | corn buttercup |
| Scirpus spp. | bulrush species |
| Senecio vulgaris | common groundsel |
| Sesbania exaltata | hemp sesbania |
| Sida spinosa | prickly sida |
| Sinapis arvensis | wild mustard |
| Spergula arvensis | corn spurry |
| Stellaria media | chickweed |
| Urtica urens | burning nettle |
| Veronica spp. | speedwell species |
| Vicia spp. | vetch species |
| Xanthium spp. | cocklebur species | without causing damage to the crop plants:

| | |
|---|---|
| beans | potatoes |
| peas | legumes |
| peanuts | alfalfa |
| cereals | clover |
| barley | Indian corn |
| oats | rice |
| rye | onions |
| wheat | |

EXAMPLE 1

In the greenhouse the plants *Hordeum vulgare, Triticum aestivum, Galium aparine, Lamium amplexicaule, Vicia* spp. and *Stellaria media* were treated at a growth height of 3 to 18 cm with the following amounts of the following individual active ingredient components and mixture thereof, each individual compound and the mixture being dispersed in 500 liters of water per hectare:

I  3-isopropyl-2,1,3-benzothiadiazinone-(4)-2,2-dioxide, 1.5 and 2 kg/hectare;

II  2-sec-butyl-4,6-dinitrophenylacetate, 0.5 and 2 kg/hectare;

I + II 1.5 + 0.5 kg/hectare.

After 8 to 12 days it was ascertained that the mixture had a better herbicidal action than that of its individual components, combined with excellent compatibility with the cereals. The results of this experiment are given below:

| Active ingredient Application rate kg/ha | I 1.5 | I 2 | II 0.5 | II 2 | I + II 1.5 + 0.5 |
|---|---|---|---|---|---|
| Hordeum vulgare | 0 | 0 | 0 | 20 | 0 |
| Triticum aestivum | 0 | 0 | 0 | 15 | 0 |
| Galium aparine | 50 | 80 | 30 | 60 | 100 |
| Lamium amplexicaule | 15 | 45 | 50 | 90 | 95 |
| Vicia spp. | 20 | 30 | 30 | 60 | 90 |
| Stellaria media | 45 | 80 | 40 | 80 | 100 |

0 = no damage
100 = complete destruction

The action of the following mixtures corresponds to that of I + II above:

3-isopropyl-2,1,3-benzothiadiazinone-(4)-2,2-dioxide, diethanolamine salt
3-isopropyl-2,1,3-benzothiadiazinone-(4)-2,2-dioxide, dimethylamine salt
3-isopropyl-2,1,3-benzothiadiazinone-(4)-2,2-dioxide, sodium salt
3-isopropyl-2,1,3-benzothiadiazinone-(4)-2,2-dioxide, potassium salt
3-isopropyl-2,1,3-benzothiadiazinone-(4)-2,2-dioxide, ethanolamine salt
3-isopropyl-2,1,3-benzothiadiazinone-(4)-2,2-dioxide, pyridine salt
3-isopropyl-2,1,3-benzothiadiazinone-(4)-2,2-dioxide, aniline salt
3-isopropyl-2,1,3-benzothiadiazinone-(4)-2,2-dioxide, phenylhydrazine salt
3-isopropyl-2,1,3-benzothiadiazinone-(4)-2,2-dioxide, dimethylethanolamine salt
3-isopropyl-2,1,3-benzothiadiazinone-(4)-2,2-dioxide, cyclohexylamine salt
3-sec-butyl-2,1,3-benzothiadiazinone-(4)-2,2-dioxide, dodecylhexamethylenimine salt
with
2-isopropyl-3-methyl-4,6-dinitrophenol 3-isopropyl-2,1,3-benzothiadiazinone-(4)-2,2-dioxide with
2-methyl-4,6-dinitrophenol
2-sec-butyl-4,6-dinitrophenol
2-tert-butyl-4,6-dinitrophenylacetate
2-tert-butyl-5-methyl-4,6-dinitrophenylacetate
2-sec-amyl-4,6-dinitrophenol
2-ethoxymethyl-4,6-dinitrophenol
2-isopropyl-3-methyl-4,6-dinitrophenol
2-(1-methylbutyl)-4,6-dinitrophenol
2-2,4,5-trichloro-6-nitrophenylchloroacetate.

EXAMPLE 2

In the greenhouse the plants Triticum aestivum, Pisum sativum, Phaseolus spp., Galium aparine, Lamium amplexicaule, Stellaria media and Chenopodium album were treated at a growth height of 2 to 18 cm with the following amounts of the following individual active ingredient components and mixtures thereof, each individual component and each mixture being emulsified or dispersed in 500 liters of water per hectare:

I 3-isopropyl-2,1,3-benzothiadiazinone-(4)-2,2-dioxide, 1.5 and 2 kg/hectare;
II 3-isopropyl-2,1,3-benzothiadiazinone-(4)-2,2-dioxide, dimethylamino salt, 1.7 and 2 kg/hectare;
III 3-sec-butyl-2,1,3-benzothiadiazinone-(4)-2,2-dioxide, 0.5 and 1.5 kg/hectare;
IV 2-methyl-4,6-dinitrophenol, sodium salt, 0.3, 0.5 and 2 kg/hectare;
V 2 sec-butyl-4,6-dinitrophenol, 1 and 1.5 kg/hectare;
I + IV 1.5 + 0.5 kg/hectare;
II + 1.7 + 0.3 kg/hectare;
III + V 0.5 + 1 kg/hectare.

The results show that the mixtures have a herbicidal action superior to that of their individual components.

| Active ingredient kg/ha | I 1.5 | I 2 | II 1.7 | II 2 | III 0.5 | III 1.5 | IV 0.3 | IV 0.5 | IV 2 |
|---|---|---|---|---|---|---|---|---|---|
| Triticum aestivum | 0 | 0 | 0 | 0 | 0 | 0 | 0 | 0 | 20 |
| Pisum sativum | 0 | 0 | 0 | 5 | 0 | 0 | 0 | 0 | 10 |
| Phaseolus spp. | 0 | 5 | 0 | 5 | 0 | 0 | 0 | 0 | 15 |
| Galium aparine | 40 | 70 | 50 | 65 | 20 | 50 | 25 | 35 | 70 |
| Lamium amplexicaule | 10 | 35 | 20 | 25 | 5 | 20 | 30 | 45 | 90 |
| Stellaria media | 40 | 75 | 50 | 60 | 20 | 65 | 30 | 40 | 80 |
| Chenopodium album | 40 | 80 | 50 | 70 | 20 | 60 | 35 | 40 | 90 |

| kg/ha | V 1 | V 1.5 | I + IV 1.5 + 0.5 | II + IV 1.7 + 0.3 | III + V 0.5 + 1 |
|---|---|---|---|---|---|
| Triticum aestivum | 0 | 10 | 0 | 0 | 0 |
| Pisum sativum | 0 | 5 | 0 | 0 | 0 |
| Phaseolus spp. | 5 | 10 | 0 | 0 | 5 |
| Galium aparine | 55 | 85 | 100 | 100 | 95 |
| Lamium amplexicaule | 60 | 85 | 90 | 90 | 90 |
| Stellaria media | 60 | 85 | 100 | 100 | 100 |
| Chenopodium album | 60 | 90 | 100 | 100 | 100 |

0 = no damage
100 = complete destruction 2-ethoxymethyl-4,6-dinitrophenol
2-methyl-4,6-dinitrophenol
2-sec-butyl-4,6-dinitrophenol
2-tert-butyl-4,6-dinitrophenylacetate
2-tert-butyl-5-methyl-4,6-dinitrophenylacetate
2-sec-butyl-4,6-dinitrophenylacetate
2-sec-amyl-4,6-dinitrophenol
2-(1-methylbutyl)-4,6-dinitrophenol
and mixtures of

We claim:
1. A herbicide composition comprising a herbicidally effective amount of a mixture of a compound of the formula a) 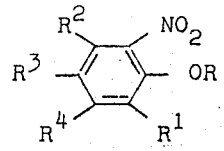

where R denotes hydrogen or acetyl, R¹ denotes lower alkyl of a maximum of 6 carbon atoms, R² denotes hydrogen or methyl, R³ denotes nitro, and R⁴ denotes hydrogen or methyl, and a compound of the formula b) , where R denotes lower alkyl of a maximum of 4 carbon atoms, or a salt thereof with sodium, lithium, potassium, calcium, iron, methylamine, trimethylamine, ethylamine, diethanolamine, ethanolamine, dimethylamine, dimethylethanolamine, ethanolamine or cyclohexylamine in a weight ratio of *a* to *b* of 1:6 to 2:1.

2. A herbicide composition as claimed in claim 1 wherein compound *a* is 2-sec-butyl-4,6-dinitrophenylacetate.

* * * * *